United States Patent
Gosselin et al.

[11] Patent Number: 5,966,991
[45] Date of Patent: Oct. 19, 1999

[54] TWO DEGREE-OF-FREEDOM SPHERICAL ORIENTING DEVICE

[75] Inventors: Clément M. Gosselin, Charlesbourg; François Caron, Longueuil, both of Canada

[73] Assignee: Université Laval, Ste-Foy, Canada

[21] Appl. No.: 09/064,553

[22] Filed: Apr. 23, 1998

[30] Foreign Application Priority Data

Apr. 23, 1997 [CA] Canada ................................ 2203483

[51] Int. Cl.⁶ ........................... G05G 11/00; F16M 11/12
[52] U.S. Cl. ................... 74/490.1; 74/490.03; 248/661; 901/23
[58] Field of Search ............................. 74/490.1, 490.03; 248/661; 901/23

[56] References Cited

U.S. PATENT DOCUMENTS

| | | | |
|---|---|---|---|
| 4,233,634 | 11/1980 | Adams | 348/373 |
| 4,628,765 | 12/1986 | Dien et al. | 74/665 A |
| 4,639,081 | 1/1987 | O'Brien | 359/478 |
| 4,654,703 | 3/1987 | Viera | 348/143 |
| 4,673,268 | 6/1987 | Wheeler et al. | 352/243 |
| 4,878,393 | 11/1989 | Duta et al. | 74/490.06 |
| 5,028,997 | 7/1991 | Elberbaum | 348/143 |
| 5,223,969 | 6/1993 | Jeandeau | 359/196 |
| 5,243,873 | 9/1993 | Demers | 74/490.06 |
| 5,418,567 | 5/1995 | Boers et al. | 348/375 |

*Primary Examiner*—Allan D. Herrmann
*Attorney, Agent, or Firm*—Swabey Ogilvy Renault

[57] ABSTRACT

The invention provides a simple rugged two degree-of-freedom spherical orienting device applicable to point payloads such as cameras, mirrors, lasers, antennas and the like. A spherical five-bar mechanism with payload support is actuated by two rotary actuators fixed in position to a base. Advantages of the device include: the preserving of image horizon for cameras (in contrast to three degree-of-freedom devices); the ability to position the payload at the geometric center of rotation thereby reducing inertia; high stiffness enabling orientation of large loads and use of high angular velocities and accelerations; simplification of inverse kinematic computation; relatively large outward workspace (approximating a hemisphere) and large internal free space for payload orienting.

5 Claims, 2 Drawing Sheets

TWO DEGREE-OF-FREEDOM SPHERICAL ORIENTING DEVICE

TECHNICAL FIELD

The invention is directed to a two degree-of-freedom spherical orientation device driven by two rotary actuators fixed to a base and a five-bar spherical mechanism with oriented payload support.

BACKGROUND OF THE ART

The invention relates to devices for orienting payloads and is of general applicability to mechanical devices, however, the tracking of moving objects is of particular interest in industrial and scientific applications. In such applications, highly accurate and rapid motion is essential. For example, tracking of flying objects for military and civilian use, robotic manipulation and vision, optical inspection and camera applications, machining and polishing operations, etc. can benefit from extremely precise and rapid orienting movements.

The invention is particularly directed to spherical orienting devices which in general provide a large work space for the oriented payload, flexibility and simple geometry.

Prior art for the spherical orienting devices suffer from several disadvantages. Often the mechanisms are extremely complex or require precision machining for accuracy. For example, in U.S. Pat. No. 4,628,765 to Dien et al., a spherical robotic wrist joint is described wherein an oriented object is pointed along an orientation axis passing through the spherical center of rotation. Dien et al. utilize two rotary actuators to drive semi-circular slotted arc members that in combination can orient a radial member within a substantially semi-spherical work space area. The advantage of utilizing only two rotary actuators is substantial, however, the advantage gained is quickly lost in the need for precision machining of the slide faces. Sliding guides are indirectly driven by the actuators inducing friction and the possibility of inaccuracy due to machining tolerances and wear over time.

Another example is provided in U.S. Pat. No. 4,878,393 to Duta, which provides a series of semi-circular hoops interacting with a sliding guide to spherically orient a radially extending arm. In this example as well, the introduction of sliding components reduces accuracy and requires high precision machining. Friction additionally introduces resistance to rapid motion and the possibility of heat buildup.

An improvement is introduced in U.S. Pat. No. 5,243,873 to Demers, providing a two-axis motion mechanism which includes roller bearings thereby improving accuracy and reducing the machining demands. However, Demers retains a single sliding guide and so does not completely eliminate the problems with the prior art.

In the above described prior art, the reliance on sliding guides compromises accuracy and induces friction. The inclusion of bearings and high precision machining does not completely eliminate the disadvantages of the system. Sliding guides are unreliable, particularly in applications where high angular velocities and accelerations are produced and extremely stable mechanisms are essential.

A three degree-of-freedom orienting device utilizing parallel spherical mechanisms has been described in the prior art (article entitled "The agile eye: a high performance three degree-of-freedom camera-orienting device", Clément M. Gosselin and Jean-Francois Hamel 1050-4729/94 IEEE, p. 781). In this article, a prototype of camera-orienting device is described. The device is stable and capable of very large angular velocities and accelerations required for tracking applications, however, due to the three degrees-of-freedom, the mechanism is very complex and contains several moving parts, all of which must be extremely accurately machined. It has been found by experience, however, that the third degree-of-freedom, i.e. torsion of the oriented camera lens, is not required for many applications. In particular, for camera orienting the maintenance of horizon is desirable as a visual reference.

In academic literature, the optimization of a spherical five-bar mechanism driven by two rotary actuators fixed to a base has been analyzed (article entitled "Optimization of Spherical Five-bar Parallel Drive Linkage", Mohamed Ouerfelli and Vijay Kumar, DE-Vol 32.-1, Advances in Design Automation 1991- Vol. 1, ASME 1991).

In this analysis a five-bar spherical mechanism is described wherein two rotary actuators are fixed to a base and orient a payload with axis radiating from the spherical center of rotation. Each joint in the mechanism has an axis of revolution passing through the spherical center of rotation and each link between joints subtends an angle of 90_. This geometry somewhat simplifies the analysis and results in a spherical linkage of components which are relatively simple to manufacture.

However, in the Ouerfelli and Kumar article, the oriented axis of the payload is disposed on an axis of rotation of one of the joints. This disposition eliminates the possibility of positioning the payload at the center of rotation. As a result, the potential for mechanically interference with links and joints increases since the payload is positioned at a distance from the spherical center of gravity. In addition, positioning the payload away from the spherical center of gravity increases inertia of the system and increases instability of payload support. In any case, the analysis is of a theoretical nature and d does not suggest the structure of a working prototype.

It is an object of the present invention to provide a simple rugged two degrees-of-freedom spherical orienting device capable of accurate orientation with large angular velocities a nd accelerations A further object of the invention is to provide a spherical orientation mechanism which can support a payload at the center of rotation thereby providing a large workspace, simplified kinematic computations, reduced inertia and reduction of interference between the payload and mechanism within a relatively large internal free operating space.

DISCLOSURE OF THE INVENTION

The invention provides a simple rugged two degree-of-freedom spherical orienting device applicable to point payloads such as cameras, mirrors, lasers, antennas and the like. A spherical five-bar mechanism with payload support is actuated by two rotary actuators fixed in position to a base.

In particular, the invention provides a two degree-of-freedom spherical orienting device comprising: a base; first and second rotary actuators, each actuator having a shaft disposed for rotation about an actuator axis of rotation, each actuator being fixed to the base with actuator axes in orthogonal relative disposition intersecting at a spherical center of rotation; payload support means for supporting a payload on an orientation axis, the support means including first and second revolute support joints each disposed for rotation about a support axis, wherein the orientation axis and each support axis pass through the spherical center of rotation in mutual orthogonal disposition; an inner sphere arm fixed to the shaft of the first rotary actuator and linked to the first revolute support joint of the payload support, the first actuator axis disposed orthogonal to the first support axis; a middle sphere arm radially inwardly linked to the second revolute support joint of the payload support and outwardly linked to a third revolute joint disposed for rotation about a linkage axis passing through the spherical center of rotation, the linkage axis disposed orthogonal to the second support axis; and an outer sphere arm fixed to the shaft of the second rotary actuator and linked to the third revolute joint, the linkage axis disposed orthogonal to the second actuator axis.

There are several advantages resulting from the unique design of the device. In contrast to a three degree-of-freedom device, the invention provides a two degree-of-freedom device which preserves the image horizon for applications such as cameras and lasers. The invention provides a simple device which enables positioning of the payload at the geometric spherical center of rotation. Positioning of the payload with its center of gravity coinciding with the spherical center of rotation significantly reduces inertia and simplifies the computation of inverse kinematics. The mechanism provides a high stiffness enabling orientation of large loads and use of high angular velocities and accelerations. A relatively large outward workspace approximating a hemisphere is provided and a large spherical internal free space is provided for payload orienting.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
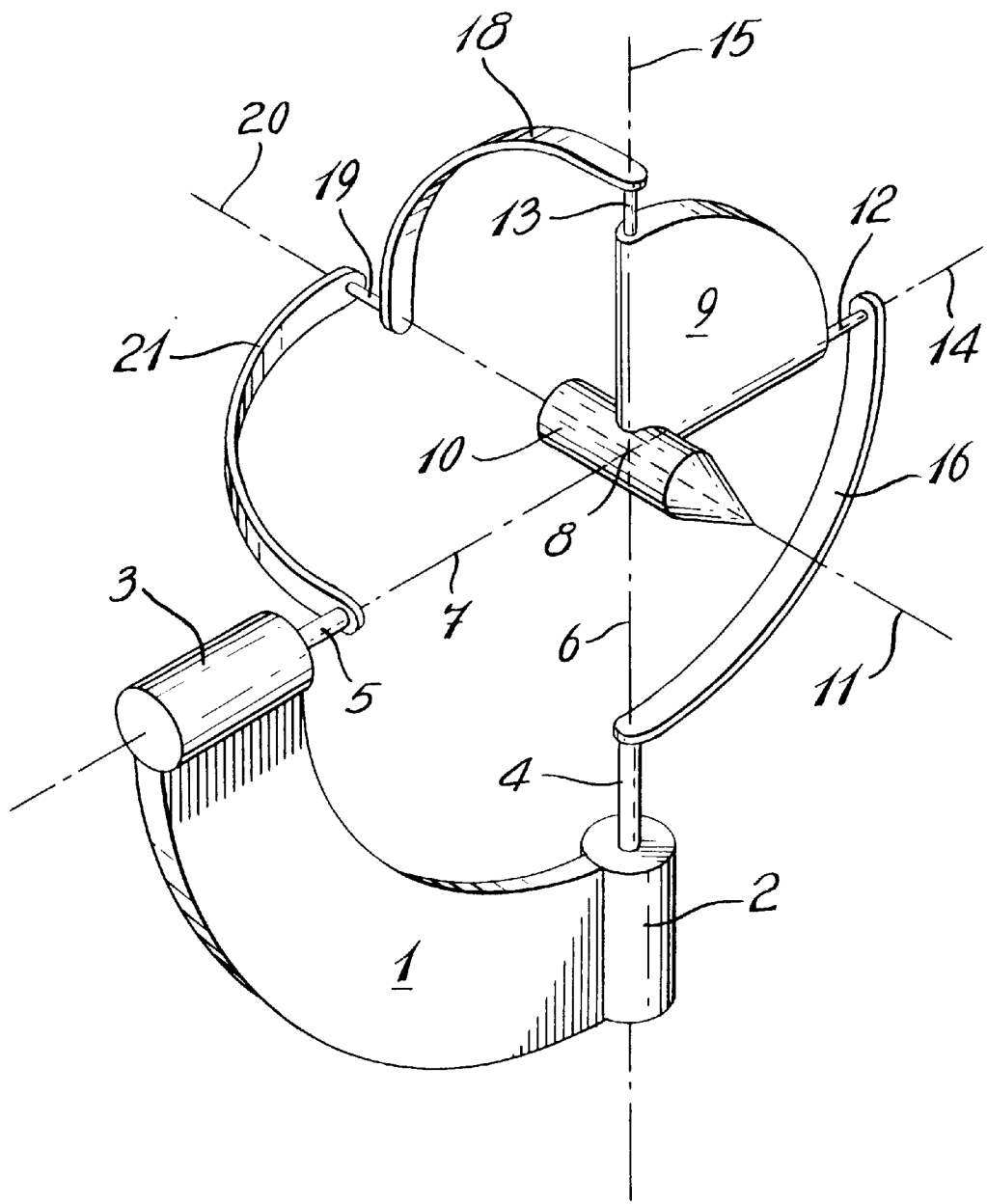
FIG. 1 is a simplified schematic view of the device showing the spherical geometry and support of a pointed payload at the spherical center of rotation.

FIG. 1 illustrates a schematic view of a fivebar two degree-of-freedom spherical orienting device according to invention.

In general the five-bar spherical orienting device can be conceptualized as two linkages defined on the great equatorial circles of a sphere. Each joint having an axis of rotation passing through the spherical center of rotation. Each moving portion of the linkages is an arc on the great circle of the sphere subtending a 90_angle. In practice the moving arms of the linkages overlap and move within concentric nested spherical orbits.

As apparent from FIG. 1, the two degree-of-freedom spherical orienting device includes a fixed position base 1 which supports a first rotary actuator 2 and a second rotary actuator 3. Each actuator 2, 3 has a shaft (4 and 5 respectively) disposed for rotation about an actuator axis of rotation (6 and 7 respectively). Each actuator 2 and 3 is fixed to the stationary base 1 and the actuator axes 6 and 7 are disposed orthogonally relative to each other intersecting at the spherical center of rotation 8.

Payload support means 9 support a payload 10 on an orientation axis 11. In the embodiment illustrated, the payload has its center of gravity or center of inertia at the spherical center of rotation 8. Such a disposition minimizes the inertia of the system and if the payload 10 is of relatively small size, the payload 10 and payload support means 9 can rotate freely within an internal spherical core space without mechanical interference. The payload support means 9 include a first revolute support joint 12 and a second revolute support joint 13, each disposed for rotation about a support axis 14 and 15, respectively.

In contrast to the prior art, however, the orientation axis 11 and each support axis 14 and 15 pass through the spherical center of rotation 8 in mutually orthogonal disposition. A review of the prior art Ouerfelli and Kumar article mentioned above, will reveal that in the prior art the orientation axis 11 coincides with one of the support axis 14 or 15. In such a mechanism, rotation of the payload 10 about the orientation axis occurs and therefore, this prior art type of mechanism is inappropriate for use in association with camera payloads 10 which require maintenance of a fixed reference horizon.

Immediately outside of the internal sphere within which the payload 10 and payload support means 9 can rotate, is an inner sphere shell within which the inner sphere arm 16 can freely rotate on the first rotary shaft 4. The inner sphere arm 16 is linked to the first revolute support joint 12 of the payload support 9 thereby permitting the payload 10 to rotate about the first support axis 14 and about the first rotary actuator axis 6 which are disposed in orthogonal relative positions.

In the alternative embodiment shown in FIG. 2, further structural support is provided as follows. The payload support 9 further includes a third revolute joint 17 which is coaxially and diametrically opposite the first revolute joint 12 and the inner sphere arm 16 is a Y-shaped yoke including two branches each linked to the first and second revolute support joints 12 and 17 respectively. By providing support on both sides of the payload 10, the support structure 9 is significantly strengthened.

The above description relates to one link of the spherical five-bar mechanism represented by the inner sphere arm 16. The second linkage of the five-bar mechanism is described as follows. A middle sphere arm 18 is radially inwardly linked to the second revolute support joint 13 for rotation about the second support axis 15. The middle sphere arm is outwardly linked to a middle revolute joint 19 which is disposed for rotation about a linkage axis 20 also passing through the spherical center of rotation 8. The linkage axis 20 is also disposed orthogonally to the second support axis 15. The middle sphere arm 18 may orbit radially about the spherical center of rotation 8 within a middle spherical shell concentric with the inner spherical shell within which the inner sphere arm 16 rotates.

Immediately outward of the middle sphere arm 18 is the outer sphere arm 21 which is fixed to the shaft 5 of the second rotary actuator 3 and linked to the middle revolute joint 19 for rotation about the second rotary axis 7. The linkage axis 20 is disposed orthogonal to the second actuator axis 7. Of course, due to mechanical interference with shaft 4 of the first rotary actuator 2, the outer sphere arm 21 cannot rotate a full 360° in practice. Further mechanical interference between the middle sphere arm 18 and the inner sphere arm 16 occurs in positions where the payload 10 is facing rearwardly from that shown in FIG. 1.

As a result therefore, the work space of the illustrated device is somewhat less than a full hemisphere, however, this is considered sufficient for many applications especially since the base 1 itself may be mounted on a moveable platform to provide a third degree-of-freedom further increasing in the work space if desired. For many applications however, the base 1 can be relatively fixed in position and an approximately hemispherical workspace is considered sufficient.

Figure 2:
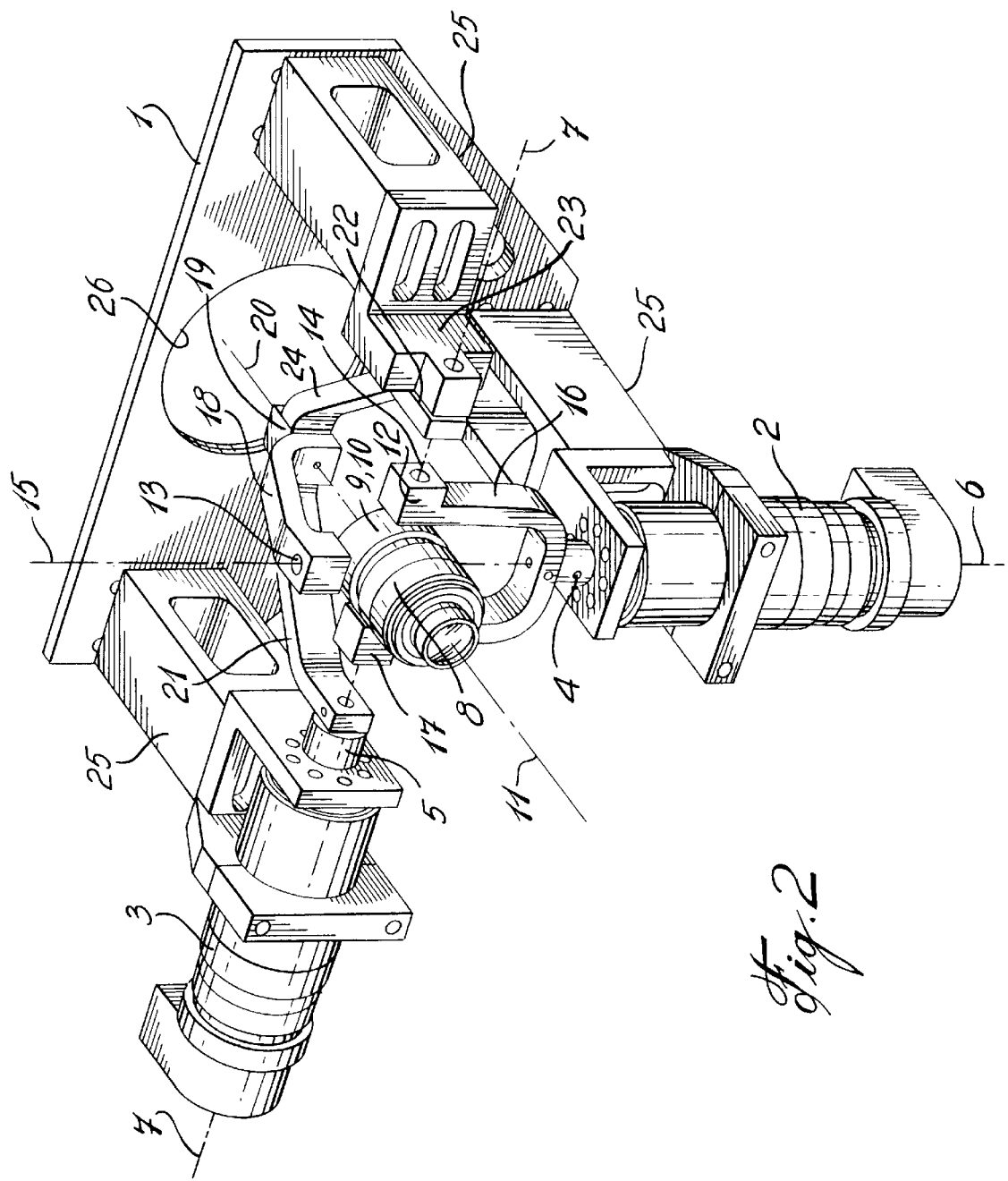
FIG. 2 is an isometric view of a realistic embodiment of the invention adapted to orient a camera payload, and modified over the FIG. 1 embodiment to enhance the structural rigidity of the mechanism with a bifurcated inner arm mounted to the first lower actuator and a saddle bearing opposite the second lateral actuator to stabilize the outer bail arm.

Referring to the alternative embodiment illustrated in FIG. 2, to provide further stability the base 1 may include a saddle joint 22 journaled in a bearing block 23 coaxial and diametrically opposite the second actuator shaft 5. In this embodiment, the outer sphere arm 21 includes an extension 24 linked to the saddle joint 22. In the embodiment illustrated in FIG. 2 therefore, the outer sphere arm 21 and attached extension 24 operate as an overhead bail capable of rotating the payload 10 about the second rotary axis 7 somewhat less than 360° due to mechanical interference with the first rotary shaft 4 and inner sphere arm 16. In some instances, it may be desirable to provide the base plate 1 with actuator mounting means 25 for mounting the actuators 2 and 3 a selected distance forward of the base plate 1. If for the particular application it is considered necessary or desirable to reverse the pointing of the payload 10, then the base plate 1 can include a rearward port opening 26 such that the camera payload 10 can view through the port 26 rearwardly.

As can be appreciated from the above description and accompanying drawings, an extremely stable spherical orienting device can be simply provided utilizing two fixed position rotary actuators 2 and 3. Rigidly mounting the actuators 2 and 3 to the base 1 minimizes the inertia of the orienting mechanism by placing relatively heavy motor actuators outside of the moving linkage arms. Inaccuracies due to vibration and centrifugal forces are substantially reduced. All moving parts may be securely journaled with roller bearings minimizing the effect of friction and wear. In contrast the prior art reliance on sliding guides render such prior art devices impractical due to extreme machine tolerances, introduction of inaccuracies and friction losses.

It can be appreciated that although the illustrated devices herein relate to a relatively small oriented object 10, the designer may adapt this mechanism for relatively large structures with equal advantage. Specifically the ability to center the mass of the payload 10 at the spherical center of rotation 8 can minimize inertia and reduce eccentric loads on the bearings. This configuration leads to higher accuracy and the ability to use higher velocities and accelerations to orient the payload balanced at the spherical center of rotation 8. In addition mounting the payload 10 at the spherical center of rotation 8 simplifies kinematic computations considerably over the prior art. This simplification of geometry not only eases the burden on the designer but also results in faster computation of orientation by computer software or control systems.

Although the above description and accompanying drawings relate to a specific preferred embodiment as presently contemplated by the inventors, it will be understood that the invention in its broad aspect includes mechanical and functional equivalents of the elements described and illustrated.

We claim:

1. A two degree-of-freedom spherical orienting device comprising:

a base;

first and second rotary actuators, each actuator having a shaft disposed for rotation about an actuator axis of rotation, each actuator being fixed to the base with actuator axes in orthogonal relative disposition intersecting at a spherical center of rotation;

payload support means for supporting a payload on an orientation axis, the support means including first and second revolute support joints each disposed for rotation about a support axis, wherein the orientation axis and each support axis pass through the spherical center of rotation in mutual orthogonal disposition;

an inner sphere arm fixed to the shaft of the first rotary actuator and linked to the first revolute support joint of the payload support, the first actuator axis disposed orthogonal to the first support axis;

a middle sphere arm radially inwardly linked to the second revolute support joint of the payload support and outwardly linked to a middle revolute joint disposed for rotation about a linkage axis passing through the spherical center of rotation, the linkage axis disposed orthogonal to the second support axis; and an outer sphere arm fixed to the shaft of the second rotary actuator and linked to the middle revolute joint, the linkage axis disposed orthogonal to the second actuator axis.

2. A device according to claim 1 wherein:

the payload support includes a third revolute joint coaxial and diametrically opposite the first revolute joint; and the inner sphere arm includes two branches linked to the first and third revolute support joint respectively.

3. A device according to claim 1 wherein:

the base includes a saddle joint coaxial and diametrically opposite the second actuator shaft; and the outer sphere arm includes an extension linked to the saddle joint.

4. A device according to claim 1 comprising payload support means for supporting the payload with its center of inertia at the spherical center of rotation.

5. A device according to claim 1 wherein the base includes a base plate with actuator mounting means for mounting the actuators a selected distance forward of the base plate, the base plate including a rearward port opening.

* * * * *